(12) United States Patent
Yu et al.

(10) Patent No.: US 10,218,466 B2
(45) Date of Patent: Feb. 26, 2019

(54) ENHANCED PHYSICAL CHANNEL TRANSMISSION METHOD, COMMUNICATIONS DEVICE, USER EQUIPMENT, AND BASE STATION

(71) Applicant: Huawei Technologies Co., Ltd., Shenzhen (CN)

(72) Inventors: Zheng Yu, Beijing (CN); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 15/222,472

(22) Filed: Jul. 28, 2016

(65) Prior Publication Data
US 2016/0337085 A1    Nov. 17, 2016

Related U.S. Application Data

(63) Continuation of application No. PCT/CN2014/071832, filed on Jan. 29, 2014.

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0053* (2013.01); *H04W 40/02* (2013.01);
(Continued)

(58) Field of Classification Search
None
See application file for complete search history.

(56) References Cited

U.S. PATENT DOCUMENTS

| 2010/0118799 | A1 | 5/2010 | Lee et al. |
| 2013/0188577 | A1* | 7/2013 | Papasakellariou .... H04W 72/04 370/329 |

(Continued)

FOREIGN PATENT DOCUMENTS

| CN | 101179361 A | 5/2008 |
| CN | 101179836 A | 5/2008 |

(Continued)

OTHER PUBLICATIONS

"Discussion on (E)PDCCH coverage enhancement," 3GPP TSG-RAN WG1 #75, R1-135425, San Francisco, USA, 3rd Generation Partnership Project, Valbonne, France (Nov. 11-15, 2013).

(Continued)

*Primary Examiner* — Lonnie V Sweet
(74) *Attorney, Agent, or Firm* — Leydig, Voit & Mayer, Ltd.

(57) ABSTRACT

The present disclosure provides an enhanced physical channel transmission method. The method includes: determining first information corresponding to each of one or more enhanced physical channel transmission levels, where the first information includes repetition configuration information and enhanced transmission configuration information that are of enhanced transmission of a physical channel; determining, according to the first information, a start radio frame of an enhanced physical channel transmission opportunity corresponding to each enhanced physical channel transmission level and a start position, in the start radio frame, of the enhanced physical channel transmission opportunity, where the start position is a start subframe, or the start position is a start physical channel transmission opportunity; and performing the enhanced transmission of the physical channel by using the start position in the start radio frame as (Continued)

a start point. Therefore, enhanced transmission of a physical channel for terminals of different levels is implemented.

18 Claims, 3 Drawing Sheets

(51) Int. Cl.
*H04W 40/02* (2009.01)
*H04W 72/12* (2009.01)
*H04W 74/04* (2009.01)

(52) U.S. Cl.
CPC ....... *H04W 72/1263* (2013.01); *H04W 74/04* (2013.01); *Y02D 70/00* (2018.01); *Y02D 70/1262* (2018.01); *Y02D 70/30* (2018.01)

(56) References Cited

U.S. PATENT DOCUMENTS

| | | | | |
|---|---|---|---|---|
| 2013/0242947 | A1* | 9/2013 | Chen | H04W 72/04 370/335 |
| 2013/0343211 | A1 | 12/2013 | Liu et al. | |
| 2014/0036747 | A1* | 2/2014 | Nory | H04W 72/0406 370/311 |
| 2014/0233407 | A1* | 8/2014 | Pourahmadi | H04L 5/0007 370/252 |
| 2015/0280881 | A1* | 10/2015 | Gao | H04W 48/12 370/329 |
| 2015/0282128 | A1* | 10/2015 | Cui | H04W 16/14 370/329 |
| 2015/0305024 | A1 | 10/2015 | Rosa et al. | |
| 2015/0365928 | A1* | 12/2015 | Lee | H04W 72/04 370/329 |
| 2016/0234810 | A1* | 8/2016 | Wong | H04W 48/12 |
| 2016/0254878 | A1* | 9/2016 | Wang | H04L 5/0053 370/329 |

FOREIGN PATENT DOCUMENTS

| | | |
|---|---|---|
| CN | 101466153 A | 6/2009 |
| CN | 101483626 A | 7/2009 |
| CN | 103067115 A | 4/2013 |
| EP | 3021626 A1 | 5/2016 |
| JP | 2015537456 A | 12/2015 |
| JP | 2017510096 A | 4/2017 |
| WO | 2015109607 A1 | 7/2015 |

OTHER PUBLICATIONS

"Coverage enhancement for physical channels and signals for low-cost MTC," 3GPP TSG RAN WG1 Meeting #72, R1-130017, St. Julian's, Malta, 3rd Generation Partnership Project, Valbonne, France (Jan. 28-Feb. 1, 2013).

"Discussion on (E)PDCCH and PUCCH coverage improvement for MTC UEs," 3GPP TSG RAN WG1 Meeting #75, San Francisco, California, R1-135021, $3^{rd}$ Generation Partnership Project, Valbonne, France (Nov. 11-15, 2013).

"Discussion on Control Channel Coverage Improvement," 3GPP TSG RAN WG1 Meeting #75, San Francisco, California, R1-135360, $3^{rd}$ Generation Partnership Project, Valbonne, France (Nov. 11-15, 2013).

"Discussion on PRACH and RACH procedure in coverage enhancement mode," 3GPP TSG-RAN WG1 #75, San Francisco, California, R1-135424, $3^{rd}$ Generation Partnership Project, Valbonne, France (Nov. 11-15, 2013).

* cited by examiner

ENHANCED PHYSICAL CHANNEL TRANSMISSION METHOD, COMMUNICATIONS DEVICE, USER EQUIPMENT, AND BASE STATION

CROSS-REFERENCE TO RELATED APPLICATIONS

This application is a continuation of International Application No. PCT/CN2014/071832, filed on Jan. 29, 2014, which is hereby incorporated by reference in its entirety.

TECHNICAL FIELD

Embodiments of the present disclosure relate to communications technologies, and in particular, to an enhanced physical channel transmission method, a communications device, user equipment, and a base station.

BACKGROUND

In the development of communications technologies, enhanced transmission is used to implement enhancement of communication in a coverage area. For example, repeated transmission, spread spectrum, transmission time interval bundling, or power increase is used to perform the enhanced transmission, so as to implement communication with a terminal at an edge of the coverage area.

However, according to the conventional technology described above, enhanced physical channel transmission of different levels cannot be implemented for different terminals.

SUMMARY

Embodiments of the present disclosure provide an enhanced physical channel transmission method, user equipment, and a base station, so as to implement enhanced transmission of different levels for different terminals.

According to a first aspect, an embodiment of the present disclosure provides an enhanced physical channel transmission method, including:

determining first information corresponding to each of one or more enhanced physical channel transmission levels, where the first information includes repetition configuration information and enhanced transmission configuration information that are of enhanced transmission of a physical channel;

determining, according to the first information, a start radio frame of an enhanced physical channel transmission opportunity corresponding to each enhanced physical channel transmission level and a start position, in the start radio frame, of the enhanced physical channel transmission opportunity, where the start position is a start subframe, or the start position is a start physical channel transmission opportunity; and performing the enhanced transmission of the physical channel by using the start position in the start radio frame as a start point.

In a first possible implementation manner, the enhanced transmission configuration information includes one or more types of information among configuration information of a time length used for the enhanced transmission, configuration information of a physical channel transmission opportunity in a radio frame, radio frame configuration information of a physical channel transmission opportunity, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information.

With reference to the first aspect or the first possible implementation manner of the first aspect, in a second possible implementation manner, at least one type of information in the first information corresponding to the multiple enhanced physical channel transmission levels is the same.

With reference to the second possible implementation manner of the first aspect, in a third possible implementation manner, that at least one type of information in the first information corresponding to the multiple enhanced physical channel transmission levels is the same includes:

at least one type of information among the configuration information of a physical channel transmission opportunity in a radio frame, the radio frame configuration information of a physical channel transmission opportunity, the format used by the physical channel, the radio frame offset information of the enhanced physical channel transmission, the subframe offset information of the enhanced physical channel transmission, the physical channel transmission opportunity offset information of the enhanced physical channel transmission, the root sequence index information, the high-speed identification information, the zero correlation zone configuration information, and the frequency offset information that are corresponding to the multiple enhanced physical channel transmission levels is the same.

With reference to the third possible implementation manner of the first aspect, in a fourth possible implementation manner, that at least one type of information in the first information corresponding to the multiple enhanced physical channel transmission levels is the same further includes:

at least one type of information among the repetition configuration information of the enhanced physical channel transmission, the configuration information of the time length used for the enhanced physical channel transmission, and the enhanced physical channel transmission cycle information that are corresponding to the multiple enhanced physical channel transmission levels is different.

With reference to any one of the first possible implementation manner of the first aspect to the fourth possible implementation manner of the first aspect, in a fifth possible implementation manner, an interval of the enhanced physical channel transmission is determined according to one or more types of information among the cycle information, the radio frame configuration information, the repetition configuration information, and the configuration information of a physical channel transmission opportunity in a radio frame.

With reference to any one of the second possible implementation manner of the first aspect or the fifth possible implementation manner of the first aspect, in a sixth possible implementation manner, before the performing the enhanced transmission of the physical channel by using the start position in the start radio frame as a start point, the method further includes:

determining a repetition quantity of the enhanced transmission of the physical channel according to one or more types of information among the repetition configuration information, the radio frame configuration information, and the configuration information of a physical channel transmission opportunity in a radio frame; or determining a repetition quantity of the enhanced transmission of the physical channel according to the repetition configuration information and second parameter information, where the second parameter is a parameter determined according to a preamble format or the enhanced physical channel transmission level.

With reference to the sixth possible implementation manner of the first aspect, in a seventh possible implementation manner, before the performing the enhanced transmission of the physical channel by using the start position in the start radio frame as a start point, the method further includes:

repeatedly transmitting the physical channel at each of consecutive physical channel transmission opportunities of the repetition quantity by using the start position in the radio frame as the start point.

With reference to the first aspect or any one of the first to the seventh possible implementation manners of the first aspect, in an eighth possible implementation manner, a system frame number SFN of the start radio frame is determined according to the enhanced transmission cycle and the radio frame offset.

With reference to the seventh possible implementation manner of the first aspect, in a ninth possible implementation manner, the SFN is a value obtained according to the following formula:

the formula is: SFN mod (the interval of the enhanced physical channel transmission)=the radio frame offset of the enhanced physical channel transmission, or (10×SFN+SFstart−SF_offset) mod T=0, where SF_offset is a subframe offset, SFstart is an index of the start subframe, T is the interval of the enhanced physical channel transmission, and mod is a modulo function, or SFN=RF_D×floor ((m×Rep_num+Occasion_offset)/ON)+RF_offset, or SFN=mod(RF_D×floor ((m×Rep_num+Occasion_offset)/ON)+RF_offset, K), or SFN=RF_D×floor ((m×Rep_num+Occasion_offset)/ON)+RF_offset, and SFN mod T=RF_offset, or SFN=mod (RF_D×floor ((m×Rep_num+Occasion_offset)/ON)+RF_offset, K), and SFN mod T=RF_offset, or SFN mod (T×RF_D×Rep_num/ON)=RF_offset, or SFN mod (RF_D×Rep_num/ON)=RF_offset, where Rep_num is the repetition quantity, RF_D is determined by the radio frame configuration information of a physical channel transmission opportunity, Occasion_offset is a physical channel transmission opportunity offset, ON is a quantity of physical channel transmission opportunities included in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

With reference to the first aspect or any one of the first to the eighth possible implementation manners of the first aspect, in a tenth possible implementation manner, the start subframe of the enhanced physical channel transmission is the first subframe in the (Occasion_offset+1)$^{th}$ physical channel transmission opportunity in the start radio frame; or an index SFstart of the start subframe is a value obtained according to the following formula:

(10×nf+SFstart−SF_offset) mod T=0, or floor (ns/2) mod T=SF_offset, or (SFstart−SF_offset) mod T=0, or the first subframe in the (X+1)$^{th}$ physical channel transmission opportunity in the start radio frame corresponding to each enhanced physical channel transmission level is used as the start subframe, where X=mod (m×Rep_num, ON), Rep_num is the repetition quantity, Occasion_offset is a physical channel transmission opportunity offset, ON is a quantity of physical channel transmission opportunities included in a radio frame that has a physical channel transmission opportunity, T is the enhanced transmission interval, nf is a number of the radio frame, SF_offset is a subframe offset, ns is a number of a timeslot in the start subframe, m is an integer greater than or equal to 0, mod is a modulo function, and floor is a rounding down function.

With reference to the first aspect or any one of the first to the ninth possible implementation manners of the first aspect, in an eleventh possible implementation manner, the start physical channel transmission opportunity is the (Occasion_offset+1)$^{th}$ physical channel transmission opportunity in the start radio frame; or the start physical channel transmission opportunity is the (X+1)$^{th}$ physical channel transmission opportunity in the start radio frame corresponding to each enhanced physical channel transmission level, where X=mod (m×Rep_num, ON); and an index Occasionstart of the start physical channel transmission opportunity is a value obtained according to the following formula, where the formula includes:

(10×nf+Occasionstart−Occasion_offset) mod T=0, or (Occasionstart−Occasion_offset) mod T=0, where Rep_num is the repetition quantity, Occasion_offset is the physical channel transmission opportunity offset, ON is the quantity of physical channel transmission opportunities included in a radio frame that has a physical channel transmission opportunity, T is the interval of the enhanced physical channel transmission, nf is a number of the radio frame, m is an integer greater than or equal to 0, mod is a modulo function, and floor is a rounding down function.

With reference to the first aspect or any one of the first to the eleventh possible implementation manners of the first aspect, in a twelfth possible implementation manner, the radio frame offset of the enhanced physical channel transmission is 0; and/or the subframe offset is an index of the first subframe in the first physical channel transmission opportunity in the radio frame; and/or the physical channel transmission opportunity offset of the enhanced physical channel transmission is 0.

With reference to the first aspect or any one of the first to the twelfth possible implementation manners of the first aspect, in a thirteenth possible implementation manner, the determining first information corresponding to each of one or more enhanced physical channel transmission levels includes:

determining, according to a first threshold, the first information corresponding to each of the one or more enhanced physical channel transmission levels, where the first threshold is determined according to one or more of maximum allowable transmit power of user equipment, initial target preamble received power, an offset value corresponding to a preamble format, a power ramping step, a quantity of preamble transmission attempts, or target physical uplink channel received power.

According to a second aspect, an embodiment of the present disclosure provides a method for determining a physical channel mode, including:

receiving a preamble sequence; and if the preamble sequence is received on a first resource, determining that the preamble is transmitted in a first mode; or if the preamble sequence is received on a second resource, determining that the preamble is transmitted in a second mode and/or at maximum allowable transmit power, where the first mode is a normal transmission mode or a non-coverage enhanced transmission mode, and the second mode is an enhanced transmission mode.

According to a third aspect, an embodiment of the present disclosure provides a method for determining a physical channel mode, including:

determining whether a first parameter value of user equipment is less than or equal to a first threshold, where the first threshold is determined according to one or more of maximum allowable transmit power of user equipment, initial target preamble received power, an offset value corresponding to a preamble format, a power ramping step, a quantity of preamble transmission attempts, or target physical uplink channel received power; and if the first parameter value of the user equipment is less than or equal to the first threshold, transmitting a physical channel by using a first resource and/or in a first mode, where the first mode is a normal transmission mode or a non-coverage enhanced transmission mode; or if the first parameter value of the user equipment is greater than the first threshold, performing enhanced transmission of a physical channel by using a second resource and/or in a second mode, where the second mode is an enhanced transmission mode.

According to a fourth aspect, an embodiment of the present disclosure provides a communications device, including: a transmitter, a receiver, a memory, and a processor separately connected to the transmitter, the receiver, and the memory, where:

the processor is configured to: determine first information corresponding to each of one or more enhanced physical channel transmission levels, where the first information includes repetition configuration information and enhanced transmission configuration information that are of enhanced transmission of a physical channel; determine, according to the first information, a start radio frame of an enhanced physical channel transmission opportunity corresponding to each enhanced physical channel transmission level and a start position, in the start radio frame, of the enhanced physical channel transmission opportunity, where the start position is a start subframe, or the start position is a start physical channel transmission opportunity; and perform the enhanced transmission of the physical channel by using the start position in the start radio frame as a start point.

In a first possible implementation manner, the enhanced transmission configuration information includes one or more types of information among configuration information of a time length used for the enhanced transmission, configuration information of a physical channel transmission opportunity in a radio frame, radio frame configuration information of a physical channel transmission opportunity, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information.

With reference to the fourth aspect or the first possible implementation manner of the fourth aspect, in a second possible implementation manner, at least one type of information in the first information corresponding to the multiple enhanced physical channel transmission levels is the same.

With reference to the second possible implementation manner of the fourth aspect, in a third possible implementation manner, at least one type of information among the configuration information of a physical channel transmission opportunity in a radio frame, the radio frame configuration information of a physical channel transmission opportunity, the format used by the physical channel, the radio frame offset information of the enhanced physical channel transmission, the subframe offset information of the enhanced physical channel transmission, the physical channel transmission opportunity offset information of the enhanced physical channel transmission, the root sequence index information, the high-speed identification information, the zero correlation zone configuration information, and the frequency offset information that are corresponding to the multiple enhanced physical channel transmission levels is the same.

With reference to the third possible implementation manner of the fourth aspect, in a fourth possible implementation manner, at least one type of information among the repetition configuration information of the enhanced physical channel transmission, the configuration information of the time length used for the enhanced physical channel transmission, and the enhanced physical channel transmission cycle information that are corresponding to the multiple enhanced physical channel transmission levels is different.

With reference to any one of the first possible implementation manner of the fourth aspect to the fourth possible implementation manner of the fourth aspect, in a fifth possible implementation manner, an interval of the enhanced physical channel transmission is determined according to one or more types of information among the cycle information, the radio frame configuration information, the repetition configuration information, and the configuration information of a physical channel transmission opportunity in a radio frame.

With reference to any one of the second possible implementation manner of the fourth aspect or the fifth possible implementation manner of the fourth aspect, in a sixth possible implementation manner, the processor is further configured to:

determine a repetition quantity of the enhanced transmission of the physical channel according to one or more types of information among the repetition configuration information, the radio frame configuration information, and the configuration information of a physical channel transmission opportunity in a radio frame; or determine a repetition quantity of the enhanced transmission of the physical channel according to the repetition configuration information and second parameter information, where the second parameter is a parameter determined according to a preamble format or the enhanced physical channel transmission level.

With reference to the sixth possible implementation manner of the fourth aspect, in a seventh possible implementation manner, the processor is specifically configured to repeatedly transmit the physical channel at each of consecutive physical channel transmission opportunities of the repetition quantity by using the start position in the radio frame as the start point.

With reference to the fourth aspect or any one of the first to the seventh possible implementation manners of the fourth aspect, in an eighth possible implementation manner, a system frame number SFN of the start radio frame is determined according to the enhanced transmission cycle and the radio frame offset.

With reference to the seventh possible implementation manner of the fourth aspect, in a ninth possible implementation manner, the SFN is a value obtained according to the following formula:

the formula is: SFN mod (the interval of the enhanced physical channel transmission)=the radio frame offset of the enhanced physical channel transmission, or (10×SFN+SFstart−SF_offset) mod T=0, where SF_offset is a subframe offset, SFstart is an index of the start subframe, T is the interval of the enhanced physical channel transmission, and mod is a modulo function, or SFN=RF_D×floor ((m×Rep_num+Occasion_offset)/ON)+RF_offset, or SFN=mod (RF_D×floor ((m×Rep_num+Occasion_offset)/ON)+RF_offset, K), or SFN=RF_D×floor ((m×Rep_num+Occasion_offset)/ON)+RF_offset, and SFN mod T=RF_offset, or SFN=mod (RF_D×floor ((m×Rep_num+Occasion_offset)/ON)+RF_offset, K), and SFN mod T=RF_offset, or SFN mod (T×RF_D×Rep_num/ON)=RF_offset, or SFN mod (RF_D×Rep_num/ON)=RF_offset, where Rep_num is the repetition quantity, RF_D is determined by the radio frame configuration information of a physical channel transmission opportunity, Occasion_offset is a physical channel transmission opportunity offset, ON is a quantity of physical channel transmission opportunities included in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

With reference to the fourth aspect or any one of the first to the eighth possible implementation manners of the fourth aspect, in a tenth possible implementation manner, the start subframe of the enhanced physical channel transmission is the first subframe in the (Occasion_offset+1)$^{th}$ physical channel transmission opportunity in the start radio frame; or an index SFstart of the start subframe is a value obtained according to the following formula:

(10×nf+SFstart−SF_offset) mod T=0, or floor (ns/2) mod T=SF_offset, or (SFstart−SF_offset) mod T=0, or the first subframe in the (X+1)$^{th}$ physical channel transmission opportunity in the start radio frame corresponding to each enhanced physical channel transmission level is used as the start subframe, where X=mod (m×Rep_num, ON), Rep_num is the repetition quantity, Occasion_offset is a physical channel transmission opportunity offset, ON is a quantity of physical channel transmission opportunities included in a radio frame that has a physical channel transmission opportunity, T is the enhanced transmission interval, nf is a number of the radio frame, SF_offset is a subframe offset, ns is a number of a timeslot in the start subframe, m is an integer greater than or equal to 0, mod is a modulo function, and floor is a rounding down function.

With reference to the fourth aspect or any one of the first to the ninth possible implementation manners of the fourth aspect, in an eleventh possible implementation manner, the start physical channel transmission opportunity is the (Occasion_offset+1)$^{th}$ physical channel transmission opportunity in the start radio frame; or the start physical channel transmission opportunity is the (X+1)$^{th}$ physical channel transmission opportunity in the start radio frame corresponding to each enhanced physical channel transmission level, where X=mod (m×Rep_num, ON); and an index Occasionstart of the start physical channel transmission opportunity is a value obtained according to the following formula, where the formula includes:

(10×nf+Occasionstart−Occasion_offset) mod T=0, or (Occasionstart−Occasion_offset) mod T=0, where Rep_num is the repetition quantity, Occasion_offset is the physical channel transmission opportunity offset, ON is the quantity of physical channel transmission opportunities included in a radio frame that has a physical channel transmission opportunity, T is the interval of the enhanced physical channel transmission, nf is a number of the radio frame, m is an integer greater than or equal to 0, mod is a modulo function, and floor is a rounding down function.

With reference to the fourth aspect or any one of the first to the eleventh possible implementation manners of the fourth aspect, in a twelfth possible implementation manner, the radio frame offset of the enhanced physical channel transmission is 0; and/or the subframe offset is an index of the first subframe in the first physical channel transmission opportunity in the radio frame; and/or the physical channel transmission opportunity offset of the enhanced physical channel transmission is 0.

With reference to the fourth aspect or any one of the first to the twelfth possible implementation manners of the fourth aspect, in a thirteenth possible implementation manner, the processor is further configured to determine, according to a first threshold, the first information corresponding to each of the one or more enhanced physical channel transmission levels, where the first threshold is determined according to one or more of maximum allowable transmit power of user equipment, initial target preamble received power, an offset value corresponding to a preamble format, a power ramping step, a quantity of preamble transmission attempts, or target physical uplink channel received power.

According to a fifth aspect, an embodiment of the present disclosure provides a communications device, including: a transmitter, a receiver, a memory, and a processor separately connected to the transmitter, the receiver, and the memory, where:

the receiver is configured to receive a preamble sequence; and the processor is configured to: if the preamble sequence is received on a first resource, determine that the preamble is transmitted in a first mode; or if the preamble sequence is received on a second resource, determine that the preamble is transmitted in a second mode and/or at maximum allowable transmit power, where the first mode is a normal transmission mode or a non-coverage enhanced transmission mode, and the second mode is an enhanced transmission mode.

According to a sixth aspect, an embodiment of the present disclosure provides user equipment, including: a transmitter, a receiver, a memory, and a processor separately connected to the transmitter, the receiver, and the memory, where:

the processor is configured to: determine whether a first parameter value of the user equipment is less than or equal to a first threshold, where the first threshold is determined according to one or more of maximum allowable transmit power of user equipment, initial target preamble received power, an offset value corresponding to a preamble format, a power ramping step, a quantity of preamble transmission attempts, or target physical uplink channel received power; and if the first parameter value of the user equipment is less than or equal to the first threshold, transmit a physical channel by using a first resource and/or in a first mode, where the first mode is a normal transmission mode or a non-coverage enhanced transmission mode; or if the first parameter value of the user equipment is greater than the first threshold, perform enhanced transmission of a physical channel by using a second resource and/or in a second mode, where the second mode is an enhanced transmission mode.

The present disclosure provides an enhanced physical channel transmission method, user equipment, and a base station. First information corresponding to each of one or more enhanced physical channel transmission levels is determined, where the first information includes repetition configuration information and enhanced transmission configuration information that are of enhanced transmission of a physical channel; a start radio frame of an enhanced physical channel transmission opportunity corresponding to each enhanced physical channel transmission level and a start position, in the start radio frame, of the enhanced physical channel transmission opportunity are determined according to the first information, where the start position is a start subframe, or the start position is a start physical channel transmission opportunity; and the enhanced transmission of the physical channel is performed by using the start position in the start radio frame as a start point. Therefore, enhanced transmission of a physical channel for terminals of different levels is implemented.

BRIEF DESCRIPTION OF DRAWINGS

To describe the technical solutions in the embodiments of the present disclosure or in the conventional technology more clearly, the following briefly introduces the accompanying drawings required for describing the embodiments or the conventional technology. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
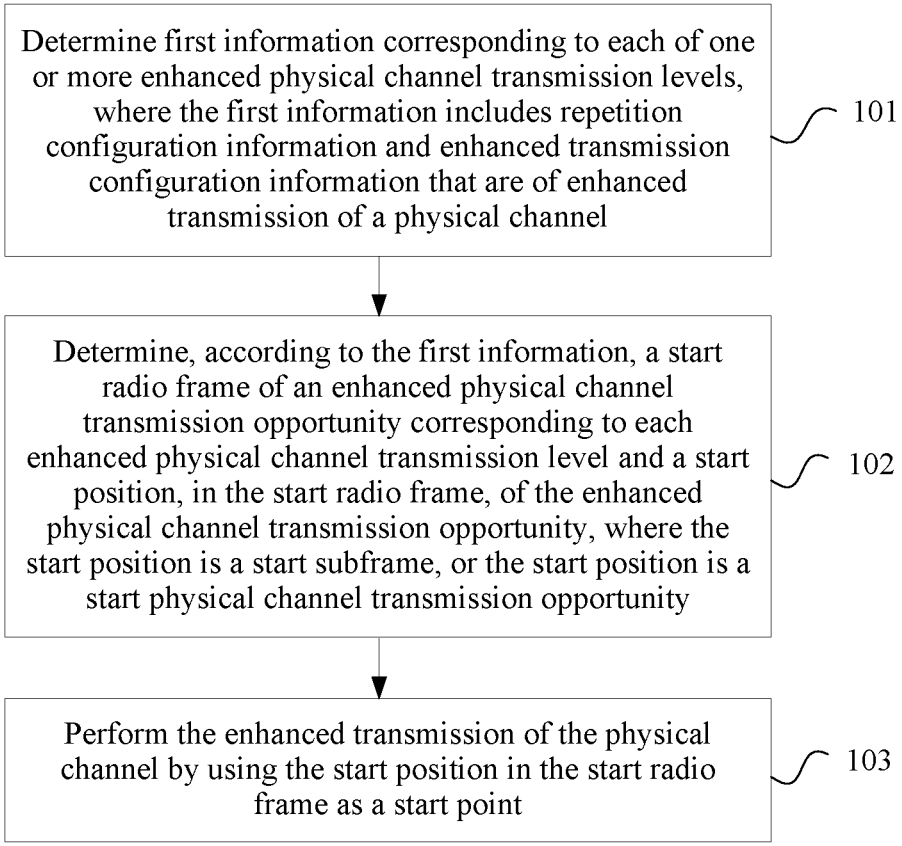
FIG. 1 is a flowchart of an enhanced physical channel transmission method according to an embodiment of the present disclosure.

FIG. 1 is a flowchart of an enhanced physical channel transmission method according to an embodiment of the present disclosure. As shown in FIG. 1, the method provided in this embodiment specifically includes the following steps:

Step 101: Determine first information corresponding to each of one or more enhanced physical channel transmission levels, where the first information includes repetition configuration information and enhanced transmission configuration information that are of enhanced transmission of a physical channel.

It should be noted that this embodiment of the present disclosure may be executed by user equipment (User Equipment, UE for short) or a base station.

In this embodiment, there are at least two following implementation scenarios of the first information corresponding to each of the one or more enhanced physical channel transmission levels:

In a first implementation scenario, each of the multiple enhanced physical channel transmission levels is corresponding to different first information.

In a second implementation scenario, at least one type of information in the first information corresponding to the multiple enhanced physical channel transmission levels is the same.

For the second implementation scenario, for example, there are N1+N2 enhanced physical channel transmission levels in total; N1 enhanced physical channel transmission levels are configured by using an enhanced physical channel transmission configuration 1, and the enhanced physical channel transmission configuration 1 is associated with the first piece of physical channel configuration information or the first physical channel configuration index; N2 enhanced physical channel transmission levels are configured by using an enhanced physical channel transmission configuration 2, and the enhanced physical channel transmission configuration 2 is associated with the second piece of physical channel configuration information or the second physical channel configuration index.

In this embodiment, the physical channel is one or more of a physical random access channel, a physical downlink control channel, an enhanced physical downlink control channel, a physical control format indicator channel, a physical hybrid automatic repeat request indicator channel, a unicast physical downlink shared channel PDSCH, a physical downlink shared channel PDSCH that carries a broadcast or multicast message, a physical uplink shared channel PUSCH, a physical uplink control channel PUCCH, a synchronization channel SCH, or a physical broadcast channel PBCH. The broadcast or multicast message is one or more of a random access response message, a random access response answer Msg3 message, a contention resolution message, system information, or a paging message.

In this embodiment, the repetition configuration information may be one or more of repetition quantity information, spreading factor information, transmission time interval bundle size information, information about times by which power is increased, or retransmission quantity information. The repetition quantity information determines a repetition quantity; the spreading factor information determines a spreading factor; the transmission time interval bundle size information determines a size of a transmission time interval bundle; the information about times by which power is increased determines the times by which power is increased; the retransmission quantity information determines a retransmission quantity of the enhanced physical channel transmission.

In this embodiment, the enhanced transmission configuration information may include one or more types of information among configuration information of a time length used for the enhanced transmission, configuration information of a physical channel transmission opportunity in a radio frame, radio frame configuration information of a physical channel transmission opportunity, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information.

For example, the configuration information of the time length used for the enhanced transmission specifies a quantity of subframes, or duration, or a quantity of radio frames that is occupied by one enhanced physical channel transmission opportunity.

For example, the configuration information of a physical channel transmission opportunity in a radio frame determines a quantity of physical channel transmission opportunities included in a radio frame that has a physical channel transmission opportunity. For example, the quantity of physical channel transmission opportunities included in the radio frame that has a physical channel transmission opportunity is ON. ON may be determined by Density per N×10 ms. For example, N=1, and Density per 10 ms=6, indicating that there are six physical channel transmission opportunities in each radio frame, that is, ON=6. For another example, Density per 10 ms=0.5, indicating that there is one physical channel transmission opportunity every two radio frames, that is, there is one physical channel transmission opportunity in a radio frame that has a physical channel transmission opportunity, that is, ON=1. ON may also be determined by a subframe number. For example, a value of ON is equal to a value of the subframe number.

For example, the radio frame configuration information of a physical channel transmission opportunity determines that all or multiple radio frames have a physical channel transmission opportunity. For example, even-numbered radio frames have a physical channel transmission opportunity, or odd-numbered radio frames have a physical channel transmission opportunity, or all the radio frames have a physical channel transmission opportunity. For example, the radio frame configuration information of a physical channel transmission opportunity determines that there is a physical channel transmission opportunity every RF_D radio frames. RF_D may be determined by Density per N×10 ms. For example, N=1, and Density per 10 ms=1, indicating that all the radio frames have a physical channel transmission opportunity, that is, RF_D=1. For another example, Density per 10 ms=0.5, indicating that there is one physical channel transmission opportunity every two radio frames, that is, RF_D=2. For another example, if a system radio frame is "any", RF_D=1; if the system radio frame is "even" or "odd", RF_D=2.

For example, the cycle information of the enhanced transmission is used to determine an interval of the enhanced physical channel transmission. A parametric value indicated by the cycle information may be in a unit of a radio frame, or in a unit of a quantity of physical channel transmission opportunities, or in a unit of a quantity of enhanced physical channel transmission opportunities, or in a unit of a repetition quantity, or in a unit of a subframe.

Further, the interval of the enhanced physical channel transmission may further be determined according to the cycle information and one or more of the radio frame configuration information of a physical channel transmission opportunity, the repetition quantity information, or the configuration information of a physical channel transmission opportunity in a radio frame.

For example, an integer indicated by the cycle information of the enhanced transmission is n, and the interval of the enhanced physical channel transmission is T. If the parametric value indicated by the enhanced physical channel transmission cycle information is: (a) in a unit of a radio frame, T=n radio frames or T=(n×RF_D) radio frames; (b) in a unit of a quantity of physical channel transmission opportunities, T=(n/ON) or T=(n×RF_D/ON) radio frames; (c) in a unit of a quantity of enhanced physical channel transmission opportunities or a repetition quantity, T=(n×Rep_num/ON) or T=(n×RF_D×Rep_num/ON) radio frames. It should be noted that, n may be a value satisfying 1024/T=a positive integer.

For example, the format used by the physical channel specifies a format used in physical channel transmission. If the physical channel is a physical random access channel, information about the format used by the physical channel specifies a preamble format used by the physical random access channel; if the physical channel is a physical downlink control channel or an enhanced physical downlink control channel, information about the format used by the physical channel specifies a downlink control information format used by the physical downlink control channel or the enhanced physical downlink control channel; if the physical channel is a physical uplink control channel, information about the format used by the physical channel specifies a format used by the physical uplink control channel. A quantity of subframes occupied by single physical channel transmission performed according to the format used in the physical channel transmission is represented by len.

Further, the second implementation scenario includes at least two cases, which specifically include:

In a first implementation scenario, the multiple enhanced physical channel transmission levels are corresponding to same first information, that is, both the repetition configuration information and the enhanced transmission configuration information that are corresponding to the multiple physical channel enhancement transmission levels are the same.

In a second implementation scenario, a part of the first information corresponding to the multiple enhanced physical channel transmission levels is the same, that is, at least one type of information in the repetition configuration information or the enhanced transmission configuration information or both that are corresponding to the multiple physical channel enhancement levels is the same.

For the second implementation scenario, for example, at least one type of information among the configuration information of a physical channel transmission opportunity in a radio frame, the radio frame configuration information of a physical channel transmission opportunity, the format used by the physical channel, the radio frame offset information of the enhanced physical channel transmission, the subframe offset information of the enhanced physical channel transmission, the physical channel transmission opportunity offset information of the enhanced physical channel transmission, the root sequence index information, the high-speed identification information, the zero correlation zone configuration information, and the frequency offset information that are corresponding to the multiple enhanced physical channel transmission levels is the same.

Further, on the basis of the foregoing embodiment, at least one type of information among the repetition configuration information of the enhanced physical channel transmission, the configuration information of the time length used for the enhanced physical channel transmission, and the enhanced physical channel transmission cycle information that are corresponding to the multiple enhanced physical channel transmission levels is different.

Step 102: Determine, according to the first information, a start radio frame of an enhanced physical channel transmission opportunity corresponding to each enhanced physical channel transmission level and a start position, in the start radio frame, of the enhanced physical channel transmission opportunity, where the start position is a start subframe, or the start position is a start physical channel transmission opportunity.

Specifically, an implementation manner of determining, according to the first information, the start radio frame of the enhanced physical channel transmission opportunity corresponding to each enhanced physical channel transmission level is:

a system frame number SFN of the start radio frame is determined according to an enhanced transmission cycle and a radio frame offset.

For example, the SFN is a value obtained according to the following formula, where the formula may be:

SFN mod (the interval of the enhanced physical channel transmission)=the radio frame offset of the enhanced physical channel transmission, or (10×SFN+SFstart−SF_offset) mod T=0, where SF_offset is a subframe offset, SFstart is an index of the start subframe, T is the interval of the enhanced physical channel transmission, and mod is a modulo function, or SFN=RF_D×floor ((m×Rep_num+Occasion_offset)/ON)+RF_offset, or SFN=mod (RF_D×floor ((m×Rep_num+Occasion_offset)/ON)+RF_offset, K), or SFN=RF_D×floor ((m×Rep_num+Occasion_offset)/ON)+RF_offset, and SFN mod T=RF_offset, or SFN=mod (RF_D×floor ((m×Rep_num+Occasion_offset)/ON)+RF_offset, K), and SFN mod T=RF_offset, or SFN mod (T×RF_D×Rep_num/ON)=RF_offset, or SFN mod (RF_D×Rep_num/ON)=RF_offset, where Rep_num is the repetition quantity, RF_D is determined by the radio frame configuration information of a physical channel transmission opportunity, Occasion_offset is a physical channel transmission opportunity offset, ON is a quantity of physical channel transmission opportunities included in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

Specifically, there are at least two implementation manners of determining, according to the first information, the start position in the start radio frame of the enhanced physical channel transmission opportunity corresponding to each enhanced physical channel transmission level:

In a first implementation manner, a start subframe in the start radio frame of the enhanced physical channel transmission opportunity corresponding to each enhanced physical channel transmission level is determined according to the first information.

In a second implementation manner, a start physical channel transmission opportunity in the start radio frame of the enhanced physical channel transmission opportunity corresponding to each enhanced physical channel transmission level is determined according to the first information.

The first implementation manner, that is, that a start subframe in the start radio frame of the enhanced physical channel transmission opportunity corresponding to each enhanced physical channel transmission level is determined according to the first information may specifically include:

the start subframe of the enhanced physical channel transmission is the first subframe in the (Occasion_offset+1)$^{th}$ physical channel transmission opportunity in the start radio frame; or an index SFstart of the start subframe is a value obtained according to the following formula:

(10×nf+SFstart−SF_offset) mod T=0, or floor (ns/2) mod T=SF_offset, or (SFstart−SF_offset) mod T=0, or the first subframe in the (X+1)$^{th}$ physical channel transmission opportunity in the start radio frame corresponding to each enhanced physical channel transmission level is used as the start subframe, where X=mod (m×Rep_num, ON), Rep_num is the repetition quantity, Occasion_offset is the physical channel transmission opportunity offset, ON is the quantity of physical channel transmission opportunities included in a radio frame that has a physical channel transmission opportunity, T is the enhanced transmission interval, nf is a number of the radio frame, SF_offset is a subframe offset, ns is a number of a timeslot in the start subframe, m is an integer greater than or equal to 0, mod is a modulo function, and floor is a rounding down function.

The second implementation manner, that is, that a start physical channel transmission opportunity in the start radio frame of the enhanced physical channel transmission opportunity corresponding to each enhanced physical channel transmission level is determined according to the first information may specifically include:

the start physical channel transmission opportunity is the (Occasion_offset+1)$^{th}$ physical channel transmission opportunity in the start radio frame; or the start physical channel transmission opportunity is the (X+1)$^{th}$ physical channel transmission opportunity in the start radio frame corresponding to each enhanced physical channel transmission level, where X=mod (m×Rep_num, ON); and an index Occasionstart of the start physical channel transmission opportunity is a value obtained according to the following formula, where the formula includes:

(10×nf+Occasionstart−Occasion_offset) mod T=0, or (Occasionstart−Occasion_offset) mod T=0, where Rep_num is the repetition quantity, Occasion_offset is the physical channel transmission opportunity offset, ON is the quantity of physical channel transmission opportunities included in a radio frame that has a physical channel transmission opportunity, T is the interval of the enhanced physical channel transmission, nf is a number of the radio frame, m is an integer greater than or equal to 0, mod is a modulo function, and floor is a rounding down function.

Step 103: Perform the enhanced transmission of the physical channel by using the start position in the start radio frame as a start point.

Specifically, there are at least two following implementation manners of performing the enhanced transmission of the physical channel by using the start position in the start radio frame as the start point:

In a first implementation manner, the enhanced transmission of the physical channel is performed by using the start subframe in the start radio frame as the start point.

In a second implementation manner, the enhanced transmission of the physical channel is performed by using the start physical channel transmission opportunity in the start radio frame as the start point.

In this embodiment, first information corresponding to each of one or more enhanced physical channel transmission levels is determined, where the first information includes repetition configuration information and enhanced transmission configuration information that are of enhanced transmission of a physical channel; a start radio frame of an enhanced physical channel transmission opportunity corresponding to each enhanced physical channel transmission level and a start position, in the start radio frame, of the enhanced physical channel transmission opportunity are determined according to the first information, where the start position is a start subframe, or the start position is a start physical channel transmission opportunity; and the enhanced transmission of the physical channel is performed by using the start position in the start radio frame as a start point. Therefore, enhanced transmission of a physical channel for terminals of different levels is implemented.

It should be noted that, all information included in the first information is configured by signaling, or a part of information included in the first information is configured by signaling, and the part of information may be pre-specified. For example, signaling configuration may be radio resource control RRC common signaling configuration and/or RRC dedicated signaling configuration. For example, if both RRC common signaling and RRC dedicated signaling configure a same piece of information, the RRC dedicated signaling configuration has a high priority. For example, the RRC common signaling configures the repetition quantity information of the enhanced physical channel transmission, and the RRC dedicated signaling also configures the repetition quantity information of the enhanced physical channel transmission. In this case, the interval of the enhanced physical channel transmission is determined based on the enhanced physical channel transmission cycle information and the repetition quantity information configured by the RRC dedicated signaling. If the RRC dedicated signaling does not configure the repetition quantity information, the interval of the enhanced physical channel transmission is determined based on the enhanced physical channel transmission cycle information and the repetition quantity information configured by the RRC common signaling.

On the basis of the foregoing embodiment, step 102 may further include:

determining a repetition quantity of the enhanced transmission of the physical channel according to one or more types of information among the repetition configuration information, the radio frame configuration information, and the configuration information of a physical channel transmission opportunity in a radio frame; or determining a repetition quantity of the enhanced transmission of the physical channel according to the repetition configuration information and second parameter information, where a second parameter is a parameter determined according to a preamble format or the enhanced physical channel transmission level.

For example, the repetition quantity information may indicate an integer value, and a product of the integer value and the quantity of physical channel transmission opportunities included in a radio frame is used as the repetition quantity, that is, the repetition quantity may be an integer multiple of a quantity of physical channel transmission opportunities included in a radio frame that supports physical channel transmission. For example, Rep_num=k×ON, where k is a positive integer.

Further, the repetition quantity may be determined according to the repetition quantity information and the second parameter information. For example, a product of a value indicated by the repetition quantity information and a value determined by the second parameter is used as the repetition quantity, where the second parameter is determined according to the preamble format or the enhanced physical channel transmission level. For example, there is a predetermined correspondence between the second parameter and the preamble format. Particularly, when the preamble format is 0 or 1, the second parameter is equal to 2. When the preamble format is 2 or 3, the second parameter is equal to 1. A correspondence between the second parameter and the preamble format may also be reflected by using a predefined table.

Further, the physical channel is repeatedly transmitted at each of consecutive physical channel transmission opportunities of the repetition quantity by using the start position in the start radio frame as the start point, where Rep_num is the repetition quantity. For example, if it is determined that start positions in the radio frame are subframes numbered 2, 5, and 8, and it is determined that the repetition quantity is 3, the physical channel is repeatedly transmitted at each of three consecutive physical channel transmission opportunities, that is, in subframes numbered 2, 5, and 8.

Further, on the basis of the foregoing embodiment, the radio frame offset of the enhanced physical channel transmission is 0; and/or the subframe offset is an index of the first subframe in the first physical channel transmission opportunity in the radio frame; and/or the physical channel transmission opportunity offset of the enhanced physical channel transmission is 0.

Further, on the basis of the foregoing embodiment, step 101 may further include:

determining, according to a first threshold, the first information corresponding to each of the one or more enhanced physical channel transmission levels, where the first threshold is determined according to one or more of maximum allowable transmit power of user equipment, initial target preamble received power, an offset value corresponding to a preamble format, a power ramping step, a quantity of preamble transmission attempts, or target physical uplink channel received power.

Figure 2:
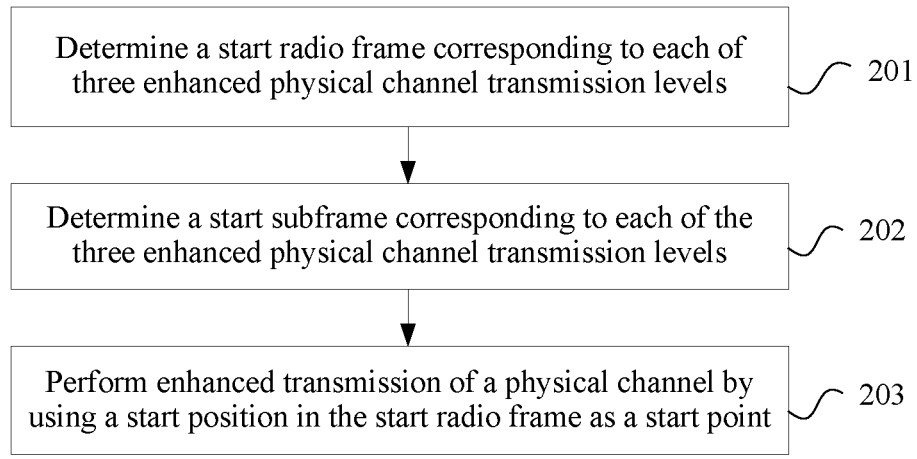
FIG. 2 is a flowchart of an enhanced physical channel transmission method according to another embodiment of the present disclosure.

FIG. 2 is a flowchart of an enhanced physical channel transmission method according to another embodiment of the present disclosure. As shown in FIG. 2, an applicable scenario of this embodiment is that an interval between start radio frames of two enhanced physical channel transmission opportunities is an integer multiple of a radio frame. There are three enhanced physical channel transmission levels, the three enhanced physical channel transmission levels are different, and repetition quantities of the three enhanced physical channel transmission levels are 1, 2, and 4, respectively. A radio frame offset of a physical channel is RF_offset=0; a transmission opportunity offset of the physical channel is Occasion_offset=0; integers indicated by enhanced physical channel transmission cycle information respectively corresponding to the three enhanced physical channel transmission levels are n1, n2, and n3. The method provided in this embodiment may specifically include the following steps:

Step 201: Determine a start radio frame corresponding to each of the three enhanced physical channel transmission levels.

In this embodiment, there are at least two following applicable scenarios of determining the start radio frame corresponding to each of the three enhanced physical channel transmission levels, which specifically include:

In a first applicable scenario, the enhanced physical channel transmission cycle information directly indicates an interval of enhanced transmission of a physical channel, that is, n1, n2, and n3 are respectively enhanced transmission intervals corresponding to the three enhanced physical channel transmission levels.

Specifically, an SFN of a start radio frame corresponding to a first enhanced physical channel transmission level satisfies SFN mod n1=0.

An SFN of a start radio frame corresponding to a second enhanced physical channel transmission level satisfies SFN mod n2=0.

An SFN of a start radio frame corresponding to a third enhanced physical channel transmission level satisfies SFN mod n3=0.

In a second applicable scenario, the enhanced physical channel transmission cycle information does not directly indicate an interval of enhanced transmission of a physical channel.

Specifically, an SFN of a start radio frame corresponding to a first enhanced physical channel transmission level satisfies: SFN mod n1×RF_D=0, or SFN mod (n1×Rep_num/ON)=0, or SFN mod (n1×RF_D×Rep_num/ON)=0, or SFN mod n1×RF_D×k=0, or SFN mod n1×k=0.

An SFN of a start radio frame corresponding to a second enhanced physical channel transmission level satisfies: SFN mod n2×RF_D=0, or SFN mod (n2×Rep_num/ON)=0, or SFN mod (n2×RF_D×Rep_num/ON)=0, or SFN mod n2×RF_D×k=0, or SFN mod n2×k=0.

An SFN of a start radio frame corresponding to a third enhanced physical channel transmission level satisfies: SFN mod n3×RF_D=0, or SFN mod (n3×Rep_num/ON)=0, or SFN mod (n3×RF_D×Rep_num/ON)=0, or SFN mod n3×RF_D×k=0, or SFN mod n3×k=0.

Step 202: Determine a start subframe corresponding to each of the three enhanced physical channel transmission levels.

Specifically, the first subframe in the first physical channel transmission opportunity in the determined start radio frame corresponding to each enhanced physical channel transmission level is used as the start subframe.

Step 203: Perform enhanced transmission of a physical channel by using a start position in the start radio frame as a start point.

Specifically, the enhanced physical channel transmission is performed by using the start subframe in the start radio frame as the start point, where the start subframe in the start radio frame is determined according to steps 201 and 202. For example, the enhanced physical channel transmission uses Rep_num consecutive physical channel transmission opportunities, and the physical channel is repeatedly transmitted at each physical channel transmission opportunity.

It should be noted that, determining a start radio frame of an enhanced physical channel transmission opportunity corresponding to each enhanced physical channel transmission level and a start position, in the start radio frame, of the enhanced physical channel transmission opportunity may further include: determining, according to root sequence index information in enhanced transmission configuration information, the start radio frame of the enhanced physical channel transmission opportunity corresponding to each enhanced physical channel transmission level and the start position of the enhanced physical channel transmission opportunity in the start radio frame.

For example, it is assumed that the physical channel is a physical random access channel (Physical Random Access Channel, PRACH for short), and the enhanced transmission configuration information determines first information, that is, configuration information of a PRACH transmission opportunity in a radio frame, radio frame configuration information of a PRACH transmission opportunity, and a format (that is, a preamble format) used by the PRACH.

Table 1 shows a correspondence in a Long Term Evolution (Long Term Evolution, LTE for short) standard between a PRACH configuration index and a preamble format, a system frame number, and a subframe number.

Specifically, the format (preamble format) used by the PRACH, the radio frame configuration information (which is determined by the system frame number) of a PRACH transmission opportunity, and the configuration information (which is determined by the subframe number) of a PRACH transmission opportunity in a radio frame may be determined according to the PRACH configuration index. SF_offset may also be determined by the subframe number. For example, SF_offset is a first value of the subframe number. For TDD, the configuration information of a PRACH transmission opportunity in a radio frame or SF_offset or both are determined by ($f_{RA}$, $t_{RA}^{(0)}$, $t_{RA}^{(1)}$, $t_{RA}^{(2)}$).

TABLE 1

| PRACH configuration index | Frame format | System frame number | Subframe number |
| --- | --- | --- | --- |
| 0 | 0 | Even | 1 |
| 1 | 0 | Even | 4 |
| 41 | 2 | Any | 1, 4, 7 |
| 42 | 2 | Any | 2, 5, 8 |
| 43 | 2 | Any | 3, 6, 9 |

For example, when the PRACH configuration index is 42, the preamble format is a format 2 (that is, each PRACH transmission opportunity occupies two subframes); the system frame number is "any", that is, all radio frames have a PRACH transmission opportunity; subframe numbers are 2, 5, and 8, that is, there are three PRACH transmission opportunities in a radio frame that has a PRACH transmission opportunity (a first PRACH transmission opportunity occupies a subframe 2 and a subframe 3; a second PRACH transmission opportunity occupies a subframe 5 and a subframe 6; a third PRACH transmission opportunity occupies a subframe 8 and a subframe 9). Therefore, len=2, RF_D=1, and ON=3.

It is assumed that one PRACH configuration index is corresponding to two enhanced PRACH transmission levels, and repetition quantities configured by repetition quantity configuration information corresponding to the two enhanced PRACH transmission levels are 3 and 6, respectively. Therefore, for a first enhanced PRACH transmission level, one enhanced PRACH transmission opportunity uses three PRACH transmission opportunities in one radio frame. For a second enhanced PRACH transmission level, one enhanced PRACH transmission opportunity uses six PRACH transmission opportunities in two radio frames. Further, it is specified that RF_offset=0, Occasion_offset=0, and intervals of the enhanced physical channel transmission that are indicated by the enhanced physical channel transmission cycle information are two radio frames and four radio frames, respectively. Then:

An SFN of a start radio frame corresponding to the first enhanced PRACH transmission level satisfies SFN mod 2=0. That is, the start radio frame corresponding to the first enhanced PRACH transmission level is: 0, 2, 4, 6, 8, . . . .

An SFN of a start radio frame corresponding to the second enhanced PRACH transmission level satisfies SFN mod 4=0. That is, the start radio frame corresponding to the second enhanced PRACH transmission level is: 0, 4, 8, 12, 16, . . . .

Because Occasion_offset=0, a start subframe corresponding to each enhanced PRACH transmission level is the first subframe in the first PRACH transmission opportunity in a start radio frame. In this example, the subframe 2 is used as the start subframe.

Enhanced PRACH transmission corresponding to the first enhanced PRACH transmission level:

uses a radio frame satisfying SFN mod 2=0 as a start point, and occupies three consecutive PRACH transmission opportunities, that is, occupies (subframes 2 and 3), (subframes 5 and 6), and (subframes 8 and 9).

Enhanced PRACH transmission corresponding to the second enhanced PRACH transmission level:

uses a radio frame satisfying SFN mod 4=0 as a start point, and occupies six consecutive PRACH transmission opportunities, that is, occupies (subframes 2 and 3), (subframes 5 and 6), and (subframes 8 and 9) in a radio frame 4L, and occupies (subframes 2 and 3), (subframes 5 and 6), and (subframes 8 and 9) in a radio frame 4L+1. Herein, L is an integer greater than or equal to 0, and what inside 0 indicates a subframe included in one PRACH transmission opportunity.

Figure 3:
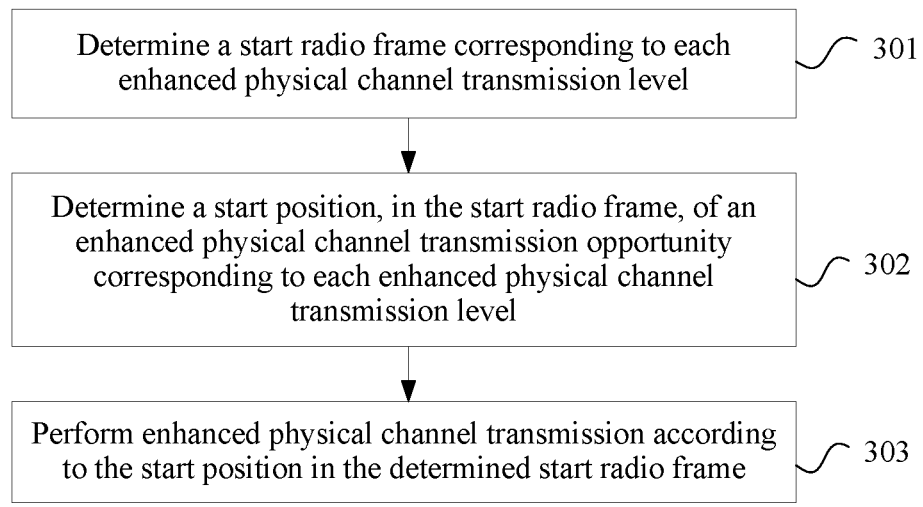
FIG. 3 is a flowchart of an enhanced physical channel transmission method according to still another embodiment of the present disclosure.

FIG. 3 is a flowchart of an enhanced physical channel transmission method according to still another embodiment of the present disclosure. As shown in FIG. 3, an applicable scenario of this embodiment is that an interval between start radio frames of two enhanced physical channel transmission opportunities is not limited to an integer multiple of a radio frame.

Step 301: Determine a start radio frame corresponding to each enhanced physical channel transmission level.

Specifically, a system frame number SFN of a start radio frame of an enhanced physical channel transmission opportunity corresponding to an enhanced physical channel transmission level i is equal to an SFN determined by the following formula:

SFN=RF_D×floor ((m×Rep_num+Occasion_offset)/ON)+RF_offset, or

SFN=mod (RF_D×floor ((m×Rep_num+Occasion_offset)/ON)+RF_offset, K), or

SFN=RF_D×floor ((m×Rep_num+Occasion_offset)/ON)+RF_offset, and

SFN mod T=RF_offset, and SFN mod T=RF_offset, or

SFN=mod (RF_D×floor ((m×Rep_num+Occasion_offset)/ON)+RF_offset, K), and SFN mod T=RF_offset, or SFN mod (T×RF_D×Rep_num/ON)=RF_offset, or SFN mod (RF_D×Rep_num/ON)=RF_offset, where floor is a rounding down function, mod is a modulo function, m is an integer greater than or equal to 0, and K is a fixed constant, for example, K=1024.

Parameters RF_D, Occasion_offset, RF_offset, Rep_num, ON, and T are the same as described above. Optionally, in consideration of information about a format used by a physical channel, Rep_num×len may further be used to substitute for Rep_num in the foregoing formula. Similarly, ON×len may further be used to substitute for ON. Typically, Rep_num is an integer multiple of ON, that is, Rep_num=d× ON, and herein, d is a pre-specified integer or an integer notified by signaling. For example, d is determined by repetition configuration information.

Step 302: Determine a start position, in the start radio frame, of an enhanced physical channel transmission opportunity corresponding to each enhanced physical channel transmission level.

There are at least two following implementation manners of step 302 in this embodiment:

In a first implementation manner, a start subframe of enhanced physical channel transmission may be obtained in the following manner:

For example, the first subframe in the (Occasion_offset+1)$^{th}$ physical channel transmission opportunity in the start radio frame of the enhanced physical channel transmission opportunity is the start subframe of the enhanced physical channel transmission, and particularly, Occasion_offset=0; or the first subframe in the (X+1)$^{th}$ physical channel transmission opportunity in the determined start radio frame corresponding to each enhanced physical channel transmission level is used as the start subframe, where X=mod (m×Rep_num, ON); or the start subframe index SFstart of the enhanced physical channel transmission satisfies (10×nf+SFstart−SF_offset) mod T=0, and herein, nf is a number of the radio frame; or the start subframe SFstart of the enhanced physical channel transmission satisfies floor (ns/2) mod T=SF_offset, and herein, floor is a rounding down function, and ns is a number of a timeslot included in the start subframe; or the start subframe SFstart of the enhanced physical channel transmission satisfies (SFstart−SF_offset) mod T=0.

In a second implementation manner, a start physical channel transmission opportunity of enhanced physical channel transmission may be determined in the following manner:

The (Occasion_offset+1)$^{th}$ physical channel transmission opportunity in the start radio frame of the enhanced physical channel transmission opportunity is the start physical channel transmission opportunity of the enhanced physical channel transmission, and particularly, Occasion_offset=0; or the (X+1)$^{th}$ physical channel transmission opportunity in the determined start radio frame corresponding to each enhanced physical channel transmission level is used as the start physical channel transmission opportunity, where X=mod (m×Rep_num, ON); or the start physical channel transmission opportunity Occasionstart of the enhanced physical channel transmission satisfies (10×nf+Occasionstart−Occasion_offset) mod T=0, and herein, nf is a number of the radio frame; or the start physical channel transmission opportunity Occasionstart of the enhanced physical channel transmission satisfies (Occasionstart−Occasion_offset) mod T=0.

Step 303: Perform enhanced physical channel transmission according to the start position in the determined start radio frame.

For example, the enhanced physical channel transmission uses Rep_num consecutive physical channel transmission opportunities, and the physical channel is repeatedly transmitted at each physical channel transmission opportunity.

On the basis of the foregoing embodiment, in this embodiment, the physical channel is a physical random access channel PRACH.

First information includes repetition quantity information of enhanced PRACH transmission, and the repetition quantity information of the enhanced PRACH transmission determines a repetition quantity of the enhanced PRACH transmission. It is assumed that a system sets I enhanced PRACH transmission levels, and herein, I is a positive integer greater than 0. An enhanced PRACH transmission configuration determines enhanced PRACH transmission repetition quantity information corresponding to the I enhanced PRACH transmission levels, that is, the enhanced PRACH transmission configuration determines enhanced PRACH transmission repetition quantity information corresponding to all of the I enhanced PRACH transmission levels. For example, repetition quantities determined by the enhanced PRACH transmission repetition quantity information that is corresponding to all of the I enhanced PRACH transmission levels and that is determined by the enhanced PRACH transmission configuration are: Rep_num1, Rep_num2, . . . , Rep_numI. Exemplarily, one piece of PRACH configuration information or one PRACH configuration index is associated with one enhanced PRACH transmission configuration. That is, one piece of PRACH configuration information or one PRACH configuration index is associated with enhanced PRACH transmission repetition quantity information corresponding to N enhanced PRACH transmission levels.

The first information further includes one or more of configuration information of a PRACH transmission opportunity in a radio frame, radio frame configuration information of a PRACH transmission opportunity, a format used by the PRACH, radio frame offset information of the enhanced PRACH transmission, subframe offset information of the enhanced PRACH transmission, enhanced PRACH transmission cycle information, or PRACH transmission opportunity offset information of the enhanced PRACH transmission. One or more of the radio frame offset information of the enhanced PRACH transmission, the subframe offset information of the enhanced PRACH transmission, the PRACH transmission opportunity offset information of the enhanced PRACH transmission, or the enhanced PRACH transmission cycle information may be determined by PRACH configuration information or be predefined.

For a system with a frame structure type 1, one PRACH configuration index or PRACH configuration information determines the following information in the first information: the configuration information of a PRACH transmission opportunity in a radio frame, the radio frame configuration information of a PRACH transmission opportunity, and the format (that is, a preamble format) used by the PRACH. Exemplarily, for FDD, the format (preamble format) used by the PRACH, the radio frame configuration information (which is determined by a system frame number) of a PRACH transmission opportunity, and the configuration information (which is determined by a subframe number) of a PRACH transmission opportunity in a radio frame are determined according to one PRACH configuration index.

It is assumed that I=3, Rep_num1=1, Rep_num2=2, and Rep_num3=4; a configured PRACH configuration index corresponding to the three enhanced PRACH transmission levels is 42, and then len=2, RF_D=1, and ON=3. It is pre-specified that K=1024; it is pre-specified that Occasion_offset is an index of the first PRACH transmission opportunity in the radio frame, and then Occasion_offset=0; it is pre-specified that RF_offset=0; it is specified that the enhanced PRACH transmission cycle information is in a unit of a quantity of enhanced PRACH transmission opportunities, and n=1. It is specified that m is an integer, and a start radio frame corresponding to each enhanced physical channel transmission level is determined.

A start radio frame of an enhanced physical channel transmission opportunity corresponding to an enhanced PRACH transmission level 1 is:
 SFN=mod (floor (m×1/3), 1024)

A start radio frame of an enhanced physical channel transmission opportunity corresponding to an enhanced PRACH transmission level 2 is:
 SFN=mod (floor (m×2/3), 1024)

A start radio frame of an enhanced physical channel transmission opportunity corresponding to an enhanced PRACH transmission level 3 is:
 SFN=mod (floor (m×4/3), 1024)

Therefore, an SFN of the start radio frame of the enhanced physical channel transmission opportunity corresponding to the enhanced PRACH transmission level 1 is:
 0, 0, 0, 1, 1, 1, 2, 2, 2, . . . .

An SFN of the start radio frame of the enhanced physical channel transmission opportunity corresponding to the enhanced PRACH transmission level 2 is:
 0, 0, 1, 2, 2, 3, 4, 4, 5, 6, 6, 7, 8, 8, . . . .

An SFN of the start radio frame of the enhanced physical channel transmission opportunity corresponding to the enhanced PRACH transmission level 3 is:
 0, 1, 2, 4, 5, 6, 8, 9, 10, 12, 13, . . . .

Further, a start subframe in the start radio frame corresponding to each enhanced physical channel transmission level is determined.

A start subframe in the start radio frame of the enhanced physical channel transmission opportunity corresponding to the enhanced PRACH transmission level 1 is the first subframe in the $(X+1)^{th}$ enhanced physical channel transmission opportunity, where X=mod (m, 3).

A start subframe in the start radio frame of the enhanced physical channel transmission opportunity corresponding to the enhanced PRACH transmission level 2 is the first subframe in the $(X+1)^{th}$ enhanced physical channel transmission opportunity, where X=mod (m×2, 3).

A start subframe in the start radio frame of the enhanced physical channel transmission opportunity corresponding to the enhanced PRACH transmission level 3 is the first subframe in the $(X+1)^{th}$ enhanced physical channel transmission opportunity, where X=mod (m×4, 3).

Therefore, the start subframe in the start radio frame of the enhanced physical channel transmission opportunity corresponding to the enhanced PRACH transmission level 1 is:
 2, 5, 8, 2, 5, 8, 2, 5, 8, . . . .

The start subframe in the start radio frame of the enhanced physical channel transmission opportunity corresponding to the enhanced PRACH transmission level 2 is:
 2, 8, 5, 2, 8, 5, 2, 8, 5, 2, 8, 5, . . . .

The start subframe in the start radio frame of the enhanced physical channel transmission opportunity corresponding to the enhanced PRACH transmission level 3 is:
 2, 5, 8, 2, 5, 8, 2, 5, 8, 2, . . . .

For a frame structure type 2, RF_D is determined by density per 10 ms Density Per 10 ms indicated by a physical random access channel configuration index PRACH Configuration Index; ON is determined by a four-tuple indicated by the physical random access channel configuration index and uplink and downlink configuration information of TDD, or ON is determined by and a random access preamble format indicated by the physical random access channel configuration index.

It should be noted that, parameters in formulas in the present disclosure are determined first information corresponding to an enhanced physical channel transmission level, and a start subframe or a start physical channel transmission opportunity, and a start radio frame that are of enhanced physical channel transmission corresponding to the enhanced physical channel transmission level and that are determined according to the first information. For different enhanced physical channel transmission levels, a start subframe or a start physical channel transmission opportunity, and a start radio frame that are of enhanced physical channel transmission corresponding to each enhanced physical channel transmission level need to be determined according to first information corresponding to the enhanced physical channel transmission level. As shown in the foregoing formulas, specifically, one or more parameters in the foregoing formulas may be associated with the enhanced physical channel transmission level i, that is, there is a functional relationship between the parameter and i. Certainly, there may also be one or more parameters in the foregoing formulas are not associated with the enhanced physical channel transmission level i, that is, there is no functional relationship between the parameter and i.

An embodiment of the present disclosure provides a method for determining a physical channel mode, where the method includes:

receiving a preamble sequence; and if the preamble sequence is received on a first resource, determining that the preamble is transmitted in a first mode; or if the preamble sequence is received on a second resource, determining that the preamble is transmitted in a second mode and/or at maximum allowable transmit power, where the first mode is a normal transmission mode or a non-coverage enhanced transmission mode, and the second mode is an enhanced transmission mode.

An embodiment of the present disclosure provides a method for determining a physical channel mode, where the method includes:

determining whether a first parameter value of user equipment is less than or equal to a first threshold, where the first threshold is determined according to one or more of maximum allowable transmit power of user equipment, initial target preamble received power, an offset value corresponding to a preamble format, a power ramping step, a quantity of preamble transmission attempts, or target physical uplink channel received power; and if the first parameter value of the user equipment is less than or equal to the first threshold, transmitting a physical channel by using a first resource and/or in a first mode, where the first mode is a normal transmission mode or a non-coverage enhanced transmission mode; or if the first parameter value of the user equipment is greater than the first threshold, performing enhanced transmission of a physical channel by using a second resource and/or in a second mode, where the second mode is an enhanced transmission mode.

An embodiment of the present disclosure provides a method, where the method includes:

determining first transmit power, where the first transmit power is final transmit power at which the preamble is transmitted according to a level n, and n is an integer; and determining second transmit power according to the first transmit power, where the second transmit power is transmit power at which the preamble is transmitted according to a level n+1.

The level is one or more of a repetition level, a resource level, a level, an enhancement level, a repetition quantity, a coverage enhanced value, a level of detection of a pre-specified channel, or times of detection of a pre-specified channel.

The determining second transmit power according to the first transmit power further includes: determining the second transmit power according to the first transmit power and second information, where the second information is one or more of power ramping, a first power offset, or a first preamble attempt quantity.

The first power offset may be a fixed power offset or a level-related power offset.

The final transmit power at which the preamble is transmitted according to the level n is highest transmit power obtained after the preamble performs power ramping according to the level n or maximum transmit power at which the preamble is transmitted according to the level n.

The transmit power at which the preamble is transmitted according to the level n+1 is initial transmit power at which the preamble is transmitted according to the level n+1 or transmit power at which the preamble is transmitted for the $m^{th}$ time according to the level n+1, where m is a positive integer.

The level 0 is a level when the preamble is not repeatedly transmitted.

A level 1 is a level when the preamble is not repeatedly transmitted, but at least one of a preamble, a time, or a frequency resource configured for preamble transmission performed by using the level 1 is different from at least one of a preamble, a time, or a frequency resource configured for preamble transmission performed by using the level 0; or the level 1 is a lowest level at which the preamble is repeatedly transmitted or a first level at which the preamble is repeatedly transmitted.

The level n (n>1) is a level at which the preamble is repeatedly transmitted.

For example, the level 0 is the level when the preamble is not repeatedly transmitted, and then final transmit power at which the preamble is transmitted according to the level 0 is a maximum value of PPRACH, where PPRACH is transmit power at which the preamble is transmitted according to the level 0, and PPRACH is determined according to one or more of maximum allowable transmit power of user equipment, a target preamble received power, or a path loss. For example, PPRACH is determined according to the following formula:

PPRACH=min $\{P_{CMAX,c}(i),$ PREAMBLE_RECEIVED_TARGET_POWER+$PL_c\}$_[dBm]

$P_{CMAX,c}(i)$ is the maximum allowable transmit power of the user equipment, PREAMBLE_RECEIVED_TARGET_POWER is the target preamble received power, $PL_c$ is the path loss, and min is a minimum function.

For example, the second transmit power "PPRACH, n+1" at which the preamble is transmitted according to the level n+1 may be determined according to the following formula:

PPRACH, n+1=min$\{P_{CMAX,c}(i),$ PPRACHmax, n+DELTA_LEVEL$\}$ $P_{CMAX,c}(i)$ is the maximum allowable transmit power of the user equipment, "PPRACHmax, n" is the final transmit power at which the preamble is transmitted according to the level n, DELTA_LEVEL is the first power offset, and min is a minimum function.

For another example, the second transmit power "PPRACH, n+1" at which the preamble is transmitted according to the level n+1 may be determined according to the following formula:

PPRACH, n+1=min $\{P_{CMAX,c}(i),$ PPRACHmax, n+DELTA_LEVEL+(PREAMBLE_TRANSMISSION_COUNTER_CURRENTLEVEL−1) powerRampingStep$\}$ $P_{CMAX,c}(i)$, is the maximum allowable transmit power of the user equipment, "PPRACHmax, n" is the final transmit power at which the preamble is transmitted according to the level n, DELTA_LEVEL is the first power offset, PREAMBLE_TRANSMISSION_COUNTER_CURRENTLEVEL is a quantity of times of preamble transmission performed according to the level n+1, powerRampingStep is a power ramping step, and min is a minimum function.

An embodiment of the present disclosure provides a manner of determining PRACH transmission and/or enhanced PRACH transmission level information, where the manner specifically includes:

determining an initial level of PRACH transmission according to first information, where the first information is one or more of a path loss between UE and a network side, reference signal received power, a master information block, a system information block, or a measurement quantity that can reflect a path loss or channel quality; and performing PRACH transmission according to the initial level.

If the first information is less than or equal to a first threshold, or the first information is determined by using a first predefined rule, the initial level of the PRACH transmission is a level 0; if the first information is greater than or equal to the first threshold, or the first information is determined by using a second predefined rule, the initial level of PRACH transmission is a level 1; or if the first information is determined by using the first predefined rule, the initial level of PRACH transmission is the level 0; if the first information is determined by using the second predefined rule, the initial level of PRACH transmission is the level 1; or if the first information is not determined by using the second predefined rule, the initial level of PRACH transmission is the level 0; if the first information is determined by using the second predefined rule, the initial level of PRACH transmission is the level 1.

The first threshold is a predefined threshold or a threshold configured by a system. The enhancement is one or more of repeated transmission, spread spectrum transmission, or time interval bundling transmission. The first rule is that the UE obtains main information by receiving an unenhanced master information block, and/or obtains system information by receiving an unenhanced system information block. The second rule is that the UE obtains main information by receiving an enhanced master information block, and/or obtains system information by receiving an enhanced system information block.

The performing PRACH transmission according to the initial level is: if random access of a PRACH by using a current level is unsuccessful, performing PRACH transmission by adding one level.

The level 0 is a level when the preamble is not repeatedly transmitted. The level 1 is the level when the preamble is not repeatedly transmitted, but at least one of a preamble, a time, or a frequency resource configured for preamble transmission performed by using the level 1 is different from at least one of a preamble, a time, or a frequency resource configured for preamble transmission performed by using the level 0; or the level 1 is a lowest level at which the preamble is repeatedly transmitted or a first level at which the preamble is repeatedly transmitted. A level n (n>1) is a level at which the preamble is repeatedly transmitted.

For example, PRACH transmission has levels 0, 1, 2, and 3; if a path loss between the UE and a base station ≤x dB, it is determined that PRACH transmission is performed by using the level 0 as the initial level; if random access of the UE by using the level 0 is unsuccessful, the UE performs PRACH transmission by progressively adding a level (for example, by using the level 1). If the path loss between the UE and the base station >x1 dB (x1 may be the same as x, or may be different from x), it is determined that PRACH transmission is performed by using the level 1 as the initial level; if random access of the UE by using the level 1 is unsuccessful, the UE performs PRACH transmission by progressively adding a level (for example, by using the level 2).

Figure 4:
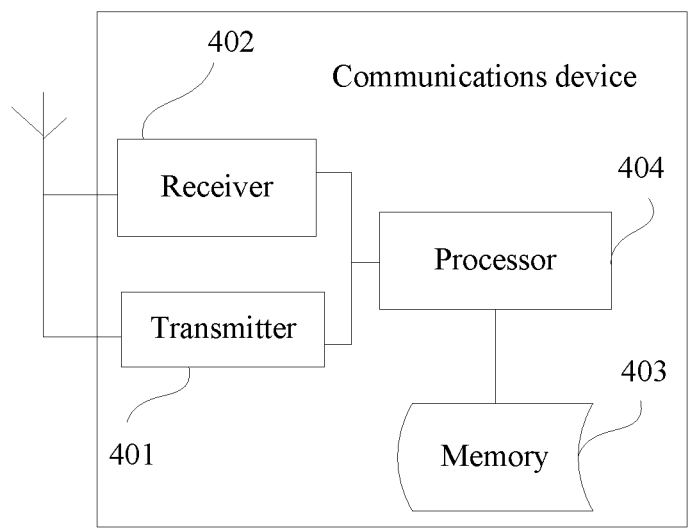
FIG. 4 is a schematic structural diagram of a communications device according to an embodiment of the present disclosure.

FIG. 4 is a schematic structural diagram of a communications device according to an embodiment of the present disclosure. As shown in FIG. 4, the communications device includes: a transmitter 401, a receiver 402, a memory 403, and a processor 404 separately connected to the transmitter 401, the receiver 402, and the memory 403.

The processor 404 is configured to: determine first information corresponding to each of one or more enhanced physical channel transmission levels, where the first information includes repetition configuration information and enhanced transmission configuration information that are of enhanced transmission of a physical channel; determine, according to the first information, a start radio frame of an enhanced physical channel transmission opportunity corresponding to each enhanced physical channel transmission level and a start position, in the start radio frame, of the enhanced physical channel transmission opportunity, where the start position is a start subframe, or the start position is a start physical channel transmission opportunity; and perform the enhanced transmission of the physical channel by using the start position in the start radio frame as a start point.

In this embodiment, first information corresponding to each of one or more enhanced physical channel transmission levels is determined, where the first information includes repetition configuration information and enhanced transmission configuration information that are of enhanced transmission of a physical channel; a start radio frame of an enhanced physical channel transmission opportunity corresponding to each enhanced physical channel transmission level and a start position, in the start radio frame, of the enhanced physical channel transmission opportunity are determined according to the first information, where the start position is a start subframe, or the start position is a start physical channel transmission opportunity; and the enhanced transmission of the physical channel is performed by using the start position in the start radio frame as a start point. Therefore, enhanced transmission of a physical channel for terminals of different levels is implemented.

On the basis of the foregoing embodiment, the enhanced transmission configuration information includes one or more types of information among configuration information of a time length used for the enhanced transmission, configuration information of a physical channel transmission opportunity in a radio frame, radio frame configuration information of a physical channel transmission opportunity, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information.

Further, on the basis of the foregoing embodiment, at least one type of information in the first information corresponding to the multiple enhanced physical channel transmission levels is the same.

Further, on the basis of the foregoing embodiment, at least one type of information among the configuration information of a physical channel transmission opportunity in a radio frame, the radio frame configuration information of a physical channel transmission opportunity, the format used by the physical channel, the radio frame offset information of the enhanced physical channel transmission, the subframe offset information of the enhanced physical channel transmission, the physical channel transmission opportunity offset information of the enhanced physical channel transmission, the root sequence index information, the high-speed identification information, the zero correlation zone configuration information, and the frequency offset information that are corresponding to the multiple enhanced physical channel transmission levels is the same.

On the basis of the foregoing embodiment, at least one type of information among the repetition configuration information of the enhanced physical channel transmission, the configuration information of the time length used for the enhanced physical channel transmission, and the enhanced physical channel transmission cycle information that are corresponding to the multiple enhanced physical channel transmission levels is different.

On the basis of the foregoing embodiment, an interval of the enhanced physical channel transmission is determined according to one or more types of information among the cycle information, the radio frame configuration information, the repetition configuration information, and the configuration information of a physical channel transmission opportunity in a radio frame.

On the basis of the foregoing embodiment, the processor 204 is further configured to: determine a repetition quantity of the enhanced transmission of the physical channel according to one or more types of information among the repetition configuration information, the radio frame configuration information, and the configuration information of a physical channel transmission opportunity in a radio frame; or determine a repetition quantity of the enhanced transmission of the physical channel according to the repetition configuration information and second parameter information, where a second parameter is a parameter determined according to a preamble format or the enhanced physical channel transmission level.

On the basis of the foregoing embodiment, the processor 404 is specifically configured to repeatedly transmit the physical channel at each of consecutive physical channel transmission opportunities of the repetition quantity by using the start position in the radio frame as the start point.

On the basis of the foregoing embodiment, a system frame number SFN of the start radio frame is determined according to an enhanced transmission cycle and a radio frame offset.

On the basis of the foregoing embodiment, the SFN is a value obtained according to the following formula:
the formula is: SFN mod (the interval of the enhanced physical channel transmission)=the radio frame offset of the enhanced physical channel transmission, or (10×SFN+SF-start−SF_offset) mod T=0, where SF_offset is a subframe offset, SFstart is an index of the start subframe, T is the interval of the enhanced physical channel transmission, and mod is a modulo function, or SFN=RF_D×floor ((m×Rep_num+Occasion_offset)/ON)+RF_offset, or SFN=mod (RF_D×floor ((m×Rep_num+Occasion_offset)/ON)+RF_offset, K), or SFN=RF_D×floor ((m×Rep_num+Occasion_offset)/ON)+RF_offset, and SFN mod T=RF_offset, or SFN=mod (RF_D×floor ((m×Rep_num+Occasion_offset)/ON)+RF_offset, K), and SFN mod T=RF_offset, or SFN mod (T×RF_D×Rep_num/ON)=RF_offset, or SFN mod (RF_D×Rep_num/ON)=RF_offset, where Rep_num is the repetition quantity, RF_D is determined by the radio frame configuration information of a physical channel transmission opportunity, Occasion_offset is a physical channel transmission opportunity offset, ON is a quantity of physical channel transmission opportunities included in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

On the basis of the foregoing embodiment, the start subframe of the enhanced physical channel transmission is the first subframe in the (Occasion_offset+1)$^{th}$ physical channel transmission opportunity in the start radio frame; or an index SFstart of the start subframe is a value obtained according to the following formula:
(10×nf+SFstart−SF_offset) mod T=0, or
floor (ns/2) mod T=SF_offset, or
(SFstart−SF_offset) mod T=0, or
the first subframe in the (X+1)$^{th}$ physical channel transmission opportunity in the start radio frame corresponding to each enhanced physical channel transmission level is used as the start subframe, where X=mod (m×Rep_num, ON), Rep_num is the repetition quantity, Occasion_offset is a physical channel transmission opportunity offset, ON is a quantity of physical channel transmission opportunities included in a radio frame that has a physical channel transmission opportunity, T is the enhanced transmission interval, of is a number of the radio frame, SF_offset is a subframe offset, ns is a number of a timeslot in the start subframe, m is an integer greater than or equal to 0, mod is a modulo function, and floor is a rounding down function.

On the basis of the foregoing embodiment, the start physical channel transmission opportunity is the (Occasion_offset+1)$^{th}$ physical channel transmission opportunity in the start radio frame; or the start physical channel transmission opportunity is the (X+1)$^{th}$ physical channel transmission opportunity in the start radio frame corresponding to each enhanced physical channel transmission level, where X=mod (m×Rep_num, ON); and an index Occasionstart of the start physical channel transmission opportunity is a value obtained according to the following formula, where the formula includes:
(10×nf+Occasionstart−Occasion_offset) mod T=0, or
(Occasionstart−Occasion_offset) mod T=0, where Rep_num is the repetition quantity, Occasion_offset is the physical channel transmission opportunity offset, ON is the quantity of physical channel transmission opportunities included in a radio frame that has a physical channel transmission opportunity, T is the interval of the enhanced physical channel transmission, of is a number of the radio frame, m is an integer greater than or equal to 0, mod is a modulo function, and floor is a rounding down function.

Further, on the basis of the foregoing embodiment, the radio frame offset of the enhanced physical channel transmission is 0; and/or the subframe offset is an index of the first subframe in the first physical channel transmission opportunity in the radio frame; and/or the physical channel transmission opportunity offset of the enhanced physical channel transmission is 0.

On the basis of the foregoing embodiment, the processor 404 is further configured to determine, according to a first threshold, the first information corresponding to each of the one or more enhanced physical channel transmission levels, where the first threshold is determined according to one or more of maximum allowable transmit power of user equipment, initial target preamble received power, an offset value corresponding to a preamble format, a power ramping step, a quantity of preamble transmission attempts, or target physical uplink channel received power.

Figure 5:
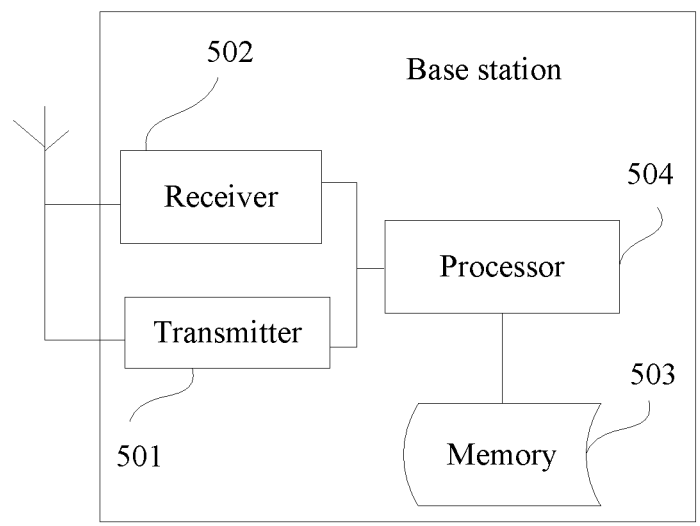
FIG. 5 is a schematic structural diagram of a base station according to an embodiment of the present disclosure.

FIG. 5 is a schematic structural diagram of a base station according to an embodiment of the present disclosure. As shown in FIG. 5, the base station includes: a transmitter 501, a receiver 502, a memory 503, and a processor 504 separately connected to the transmitter 501, the receiver 502, and the memory 503. The receiver 502 is configured to receive a preamble sequence. The processor 504 is configured to: if the preamble sequence is received on a first resource, determine that the preamble is transmitted in a first mode; or if the preamble sequence is received on a second resource, determine that the preamble is transmitted in a second mode and/or at maximum allowable transmit power, where the first mode is a normal transmission mode or a non-coverage enhanced transmission mode, and the second mode is an enhanced transmission mode.

Figure 6:
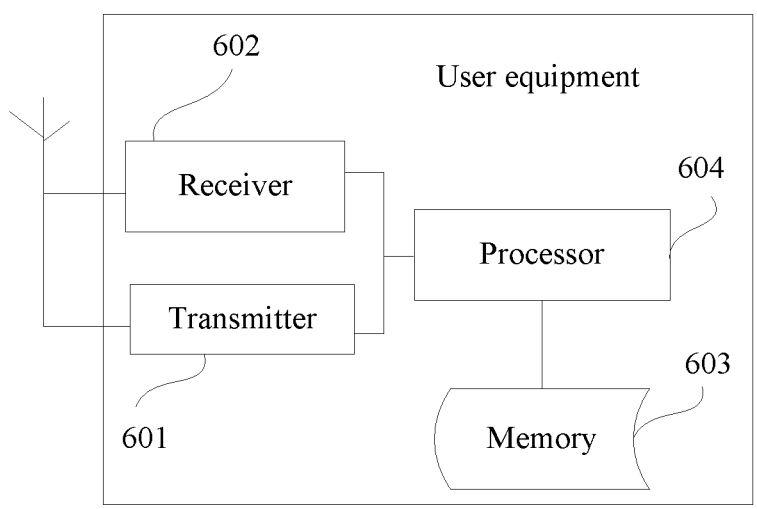
FIG. 6 is a schematic structural diagram of user equipment according to an embodiment of the present disclosure.

FIG. 6 is a schematic structural diagram of user equipment according to an embodiment of the present disclosure. The user equipment includes: a transmitter 601, a receiver 602, a memory 603, and a processor 604 separately connected to the transmitter 601, the receiver 602, and the memory 603. The processor 604 is configured to: determine whether a first parameter value of the user equipment is less than or equal to a first threshold, where the first threshold is determined according to one or more of maximum allowable transmit power of user equipment, initial target preamble received power, an offset value corresponding to a preamble format, a power ramping step, a quantity of preamble transmission attempts, or target physical uplink channel received power; and if the first parameter value of the user equipment is less than or equal to the first threshold, transmit a physical channel by using a first resource and/or in a first mode, where the first mode is a normal transmission mode or a non-coverage enhanced transmission mode; or if the first parameter value of the user equipment is greater than the first threshold, perform enhanced transmission of a physical channel by using a second resource and/or in a second mode, where the second mode is an enhanced transmission mode.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An enhanced physical channel transmission method at a base station or a user equipment served by the base station, comprising:
   determining each first information corresponding to each of one or more enhanced physical channel transmission levels, wherein each enhanced physical channel transmission level is respectively configured by the first information, and each first information comprises repetition configuration information and enhanced transmission configuration information that are of enhanced transmission of a physical channel, wherein the repetition configuration information is a repetition quantity of the enhanced transmission, and the enhanced transmission configuration information at least comprises a radio frame configuration information of an enhanced physical channel transmission opportunity and/or configuration information of the enhanced physical channel transmission opportunity;
   determining, according to each first information, a start radio frame of an enhanced physical channel transmission opportunity corresponding to each enhanced physical channel transmission level and a start position, in the start radio frame, of the enhanced physical channel transmission opportunity, wherein the start position is a start subframe; and
   performing the enhanced transmission of the physical channel by using the start position in the start radio frame as a start point;
   wherein
   the first subframe in the $(X+1)^{th}$ physical channel transmission opportunity in the start radio frame corresponding to each enhanced physical channel transmission level is used as the start subframe, and
   $X=\text{mod }(m \times \text{Rep\_num}, ON)$,
   wherein Rep_num is the repetition quantity, ON is a quantity of physical channel transmission opportunities comprised in a radio frame that has a physical channel transmission opportunity, m is an integer greater than or equal to 0, mod is a modulo function.

2. The method according to claim 1, wherein the enhanced transmission configuration information comprises one or more types of information among configuration information of a time length used for the enhanced transmission, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information;
   wherein at least one type of information in the first information corresponding to the multiple enhanced physical channel transmission levels is the same.

3. The method according to claim 2, before the performing the enhanced transmission of the physical channel by using the start position in the start radio frame as a start point, further comprising:
   determining the repetition quantity of the enhanced transmission of the physical channel according to one or more types of information among the repetition configuration information, the radio frame configuration information, and the configuration information of the physical channel transmission opportunity.

4. The method according to claim 3,
wherein the performing the enhanced transmission of the physical channel by using the start position in the start radio frame as a start point comprises:
repeatedly transmitting the physical channel at each of consecutive physical channel transmission opportunities of the repetition quantity by using the start position in the radio frame as the start point.

5. The method according to claim 4,
wherein a system frame number (SFN) is a value obtained according to the following formula:
the formula is:
SFN=RF_D×floor ((m×Rep_num+Occasion_offset)/ON)+RF_offset, or
SFN=mod (RF_D×floor ((m×Rep_num+Occasion_offset)/ON)+RF_offset, K), or
SFN=RF_D×floor ((m×Rep_num+Occasion_offset)/ON)+RF_offset, and SFN mod T=RF_offset, or
SFN=mod (RF_D×floor ((m×Rep_num+Occasion_offset)/ON)+RF_offset, K), and SFN mod T=RF_offset, or
SFN mod (T×RF_D×Rep_num/ON)=RF_offset, or
SFN mod (RF_D×Rep_num/ON)=RF_offset, wherein Rep_num is the repetition quantity, RF_D is determined by the radio frame configuration information of a physical channel transmission opportunity, Occasion_offset is a physical channel transmission opportunity offset, ON is a quantity of physical channel transmission opportunities comprised in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

6. The method according to claim 1, wherein the determining first information corresponding to each of one or more enhanced physical channel transmission levels comprises:
determining, according to a first threshold, the first information corresponding to each of the one or more enhanced physical channel transmission levels, wherein the first threshold is determined according to one or more of maximum allowable transmit power of the user equipment, initial target preamble received power, an offset value corresponding to a preamble format, a power ramping step, a quantity of preamble transmission attempts, or target physical uplink channel received power.

7. A communications device, comprising: a transmitter, a receiver, a memory, and a processor connected to the transmitter, the receiver, and the memory, wherein:
the processor is configured to: determine each first information corresponding to each of one or more enhanced physical channel transmission levels, wherein each enhanced physical channel transmission level is respectively configured by the first information, and each first information comprises repetition configuration information and enhanced transmission configuration information that are of enhanced transmission of a physical channel, wherein the repetition configuration information is a repetition quantity of the enhanced transmission, and the enhanced transmission configuration information comprises at least radio frame configuration information of an enhanced physical channel transmission opportunity and/or configuration information of the enhanced physical channel transmission opportunity;
determine, according to each first information, a start radio frame of an enhanced physical channel transmission opportunity corresponding to each enhanced physical channel transmission level and a start position, in the start radio frame, of the enhanced physical channel transmission opportunity, wherein the start position is a start subframe; and
perform the enhanced transmission of the physical channel by using the start position in the start radio frame as a start point;
wherein
the first subframe in the $(X+1)^{th}$ physical channel transmission opportunity in the start radio frame corresponding to each enhanced physical channel transmission level is used as the start subframe, and
X=mod (m×Rep_num, ON),
wherein Rep_num is the repetition quantity, ON is a quantity of physical channel transmission opportunities comprised in a radio frame that has a physical channel transmission opportunity, m is an integer greater than or equal to 0, mod is a modulo function.

8. The communications device according to claim 7, wherein the enhanced transmission configuration information comprises one or more types of information among configuration information of a time length used for the enhanced transmission, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information;
wherein at least one type of information in the first information corresponding to the multiple enhanced physical channel transmission levels is the same.

9. The communications device according to claim 8, wherein the processor is further configured to: determine the repetition quantity of the enhanced transmission of the physical channel according to one or more types of information among the repetition configuration information, the radio frame configuration information, and the configuration information of the physical channel transmission opportunity.

10. The communications device according to claim 9, wherein the processor is configured to repeatedly transmit the physical channel at each of consecutive physical channel transmission opportunities of the repetition quantity by using the start position in the radio frame as the start point.

11. The communications device according to claim 10, wherein a system frame number (SFN) is a value obtained by using the following formula:
the formula is:
SFN=RF_D×floor ((m×Rep_num+Occasion_offset)/ON)+RF_offset, or
SFN=mod (RF_D×floor ((m×Rep_num+Occasion_offset)/ON)+RF_offset, K), or
SFN=RF_D×floor ((m×Rep_num+Occasion_offset)/ON)+RF_offset, and SFN mod T=RF_offset, or
SFN=mod (RF_D×floor ((m×Rep_num+Occasion_offset)/ON)+RF_offset, K), and SFN mod T=RF_offset, or
SFN mod (T×RF_D×Rep_num/ON)=RF_offset, or
SFN mod (RF_D×Rep_num/ON)=RF_offset, wherein Rep_num is the repetition quantity, RF_D is determined by the radio frame configuration information of a physical channel transmission opportunity, Occasion_offset is a physical channel transmission opportunity offset, ON is a quantity of physical channel transmission opportunities comprised in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

12. The communications device according to claim 7, wherein the processor is further configured to determine, according to a first threshold, the first information corresponding to each of the one or more enhanced physical channel transmission levels, wherein the first threshold is determined according to one or more of maximum allowable transmit power of user equipment, initial target preamble received power, an offset value corresponding to a preamble format, a power ramping step, a quantity of preamble transmission attempts, or target physical uplink channel received power.

13. A non-transitory, computer readable medium, comprising processor-executable instructions which when executed by a processor, causing the processor to implement operations of enhanced physical channel transmission, the operations including:
  determining each first information corresponding to each of one or more enhanced physical channel transmission levels, wherein each enhanced physical channel transmission level is respectively configured by the first information, and each first information comprises repetition configuration information and enhanced transmission configuration information that are of enhanced transmission of a physical channel, wherein the repetition configuration information is a repetition quantity of the enhanced transmission, and the enhanced transmission configuration information at least comprises a radio frame configuration information of an enhanced physical channel transmission opportunity and/or configuration information of the enhanced physical channel transmission opportunity;
  determining, according to each first information, a start radio frame of an enhanced physical channel transmission opportunity corresponding to each enhanced physical channel transmission level and a start position, in the start radio frame, of the enhanced physical channel transmission opportunity, wherein the start position is a start subframe; and
  performing the enhanced transmission of the physical channel by using the start position in the start radio frame as a start point;
  wherein the first subframe in the $(X+1)^{th}$ physical channel transmission opportunity in the start radio frame corresponding to each enhanced physical channel transmission level is used as the start subframe, and
  X=mod (m×Rep_num, ON),
  wherein Rep_num is the repetition quantity, ON is a quantity of physical channel transmission opportunities comprised in a radio frame that has a physical channel transmission opportunity, m is an integer greater than or equal to 0, mod is a modulo function.

14. The non-transitory, computer readable medium according to claim 13, wherein the enhanced transmission configuration information comprises one or more types of information among configuration information of a time length used for the enhanced transmission, cycle information of the enhanced transmission, a format used by the physical channel, radio frame offset information of the enhanced transmission, subframe offset information of the enhanced transmission, physical channel transmission opportunity offset information, root sequence index information, high-speed identification information, zero correlation zone configuration information, and frequency offset information;
  wherein at least one type of information in the first information corresponding to the multiple enhanced physical channel transmission levels is the same.

15. The non-transitory, computer readable medium according to claim 14, before the performing the enhanced transmission of the physical channel by using the start position in the start radio frame as a start point, further comprising:
  determining the repetition quantity of the enhanced transmission of the physical channel according to one or more types of information among the repetition configuration information, the radio frame configuration information, and the configuration information of the physical channel transmission opportunity.

16. The non-transitory, computer readable medium according to claim 15,
  wherein the operation of performing the enhanced transmission of the physical channel by using the start position in the start radio frame as a start point comprises:
  repeatedly transmitting the physical channel at each of consecutive physical channel transmission opportunities of the repetition quantity by using the start position in the radio frame as the start point.

17. The non-transitory, computer readable medium according to claim 16,
  wherein a system frame number (SFN) is a value obtained according to the following formula:
  the formula is: SFN=RF_D×floor ((m×Rep_num+Occasion_offset)/ON)+RF_offset, or
  SFN=mod (RF_D×floor ((m×Rep_num+Occasion_offset)/ON)+RF_offset, K), or
  SFN=RF_D×floor ((m×Rep_num+Occasion_offset)/ON)+RF_offset, and SFN mod T=RF_offset, or
  SFN=mod (RF_D×floor ((m×Rep_num+Occasion_offset)/ON)+RF_offset, K), and SFN mod T=RF_offset, or
  SFN mod (T×RF_D×Rep_num/ON)=RF_offset, or
  SFN mod (RF_D×Rep_num/ON)=RF_offset, wherein Rep_num is the repetition quantity, RF_D is determined by the radio frame configuration information of a physical channel transmission opportunity, Occasion_offset is a physical channel transmission opportunity offset, ON is a quantity of physical channel transmission opportunities comprised in a radio frame that has a physical channel transmission opportunity, RF_offset is a radio frame offset, K is a fixed constant, T is the interval of the enhanced physical channel transmission, m is an integer greater than or equal to 0, floor is a rounding down function, and mod is a modulo function.

18. The non-transitory, computer readable medium according to claim 13, wherein the operation of determining first information corresponding to each of one or more enhanced physical channel transmission levels comprises:
  determining, according to a first threshold, the first information corresponding to each of the one or more enhanced physical channel transmission levels, wherein the first threshold is determined according to one or more of maximum allowable transmit power of the user equipment, initial target preamble received power, an offset value corresponding to a preamble format, a power ramping step, a quantity of preamble transmission attempts, or target physical uplink channel received power.

* * * * *